(12) United States Patent
Tucker

(10) Patent No.: US 6,571,597 B1
(45) Date of Patent: Jun. 3, 2003

(54) PROCESS FOR PROVIDING METAL STAMPINGS WITH INTEGRAL STUDS

(75) Inventor: Herbert J. Tucker, Huntingdon Valley, PA (US)

(73) Assignee: Tucker Industries, Inc., Bensalem, PA (US)

( * ) Notice: Subject to any disclaimer, the term of this patent is extended or adjusted under 35 U.S.C. 154(b) by 0 days.

(21) Appl. No.: 09/825,810

(22) Filed: Apr. 4, 2001

(51) Int. Cl.[7] .............................................. B21D 31/00
(52) U.S. Cl. ...................... 72/379.2; 29/897.2
(58) Field of Search ............................. 24/698.2, 698.1, 24/563, 570, 129 R, 130, 129 B, 129 W; 83/55, 676, 856, 102; 29/897.2; 72/379.2, 325, 326, 186

(56) References Cited

U.S. PATENT DOCUMENTS

| | | | | |
|---|---|---|---|---|
| 184,397 A | * | 11/1876 | Macumber ............. | 24/697.2 X |
| 500,365 A | * | 6/1893 | Berbecker .............. | 24/130 X |
| 691,915 A | * | 1/1902 | Robertson .............. | 24/20 R |
| 1,980,154 A | * | 11/1934 | Coe ........................ | 24/20 R |
| 3,176,873 A | * | 4/1965 | Montgomery .......... | 24/130 X |
| 3,234,610 A | * | 2/1966 | Timmerbeil et al. ... | 24/20 R |
| 3,462,805 A | * | 8/1969 | Quisling ................ | 24/20 E X |
| 3,877,280 A | * | 4/1975 | Cornell .................. | 29/243.519 |
| 4,020,544 A | * | 5/1977 | Smith et al. ............ | 29/513 |
| 4,216,637 A | | 8/1980 | Kraus | |
| 4,220,681 A | * | 9/1980 | Narita .................... | 428/31 |
| 4,278,865 A | * | 7/1981 | Watanabe et al. ...... | 219/99 |
| 4,688,692 A | * | 8/1987 | Humbs et al. .......... | 220/3.8 |
| 5,022,253 A | * | 6/1991 | Parlatore ................ | 72/325 |
| 5,117,536 A | * | 6/1992 | Beach et al. ........... | 24/20 R |
| 5,638,583 A | * | 6/1997 | Tseng .................... | 24/67.5 |
| 5,808,264 A | | 9/1998 | Stepetic et al. | |
| 6,076,246 A | * | 6/2000 | McCooey ............... | 29/469.5 |
| 6,109,086 A | * | 8/2000 | Gambrel et al. ....... | 72/326 |

* cited by examiner

Primary Examiner—Robert J. Sandy
(74) Attorney, Agent, or Firm—Caesar, Revise, Bernstein, Cohen & Pokotilow, Ltd.

(57) ABSTRACT

Integral studs, such as T-studs, are cut from metal sheets on which the studs are to be deployed. A process for providing integral studs includes cutting the studs from the sheet metal on which the studs are to be deployed, and elevating the studs above the plane defined by the sheet metal. The process obviates the need for welding or otherwise attaching non-integral studs to the sheet metal.

14 Claims, 1 Drawing Sheet

PROCESS FOR PROVIDING METAL STAMPINGS WITH INTEGRAL STUDS

BACKGROUND OF THE INVENTION

1. Field of Invention

This invention relates to fasteners for attaching objects to sheet metal substrates, and more particularly to simulated studs that are formed from the sheet metal substrates on which the studs are provided.

2. Description of Related Art

Manufacturers of industrial machines quite often make use of wire harnesses to distribute electrical power to various locations within a machine. It is common to run bundles of wire along a sheet metal panel in order to distribute the bundles of wires. These bundles are often anchored to a sheet panel in discrete locations to prevent the wires from coming in contact with harmful elements.

A common approach to anchoring these wire bundles to a panel makes use of a plastic molded cable mount with an adhesive backing. Examples of an adhesive backed cable tie mount are manufactured by the Panduit Corporation, catalogue E-CC-10, page 8 (1996). The Panduit adhesive mount series are simply applied to a sheet panel via the adhesive backing on the cable tie mount itself. This provides for an anchor point for a cable tie.

The disadvantage of the Panduit adhesive mount is its tendency to dislodge itself over time from the sheet panel. The adhesive backing quite often fails when too much load is placed on the adhesive mount. Also, the final placement of the adhesive backed mount on a panel is quite often inconsistent due to the installation process of simply laying the adhesive mount on a sheet panel.

Another common approach to anchoring these wire bundles to a panel makes use of a cable mount that is screwed to a panel. Examples of a screwed mount are also manufactured by the Panduit Corporation, catalogue E-CC-10, page 8. The Panduit screw mount is simply fastened to a panel with the use of a common screw. Upon fastening the mount to a panel, a cable tie is then used to secure the wire bundle to the sheet panel.

The disadvantage of the Panduit screw mount is the excess labor required to provide for a threaded hole in a sheet panel in preparation for a screw that is needed for holding the screw mount in position.

Other anchoring devices suffer from similar defects. For example, "T-studs" are often used in large quantities in the manufacture of automobiles, motorcycles and other machinery. The shank of the T-stud is welded to a workpiece, with the head providing a convenient base for further attachments (e.g., harnesses, trim, and conduits such as wires and hoses, etc.) to be secured to the workpiece. Such attachments typically include retainer clips adapted to retain the head of each T-stud. See, e.g., U.S. Pat. No. 4,216,637 to Kraus.

Attaching the T-studs to the workpiece requires a number of manufacturing steps that increase costs and delays. Conventional T-studs are manufactured separately from the workpiece and are joined to the panel by, e.g., welding. Welded joints must be cleaned and tested to ensure that the weld does not fail. In addition, U.S. Pat. No. 5,808,264 to Stepetic et al. reports that jamming of automatic stud welding devices can also be a problem.

Accordingly, it is desired to provide a stud or similar attachment means, which would be formed as an integral part of the substrate.

All references cited herein are incorporated herein by reference in their entireties.

BRIEF SUMMARY OF THE INVENTION

Accordingly, the invention provides a workpiece comprising sheet metal including an integral stud adapted to retain a clip.

Also provided is an improved process for providing a T-stud on a metal workpiece, wherein the improvement comprises forming the T-stud from an integral tab cut from the metal workpiece. The process is preferably conducted without welding.

BRIEF DESCRIPTION OF SEVERAL VIEWS OF THE DRAWINGS

The invention will be described in conjunction with the following drawing wherein.

DETAILED DESCRIPTION OF THE INVENTION

Figure 1:
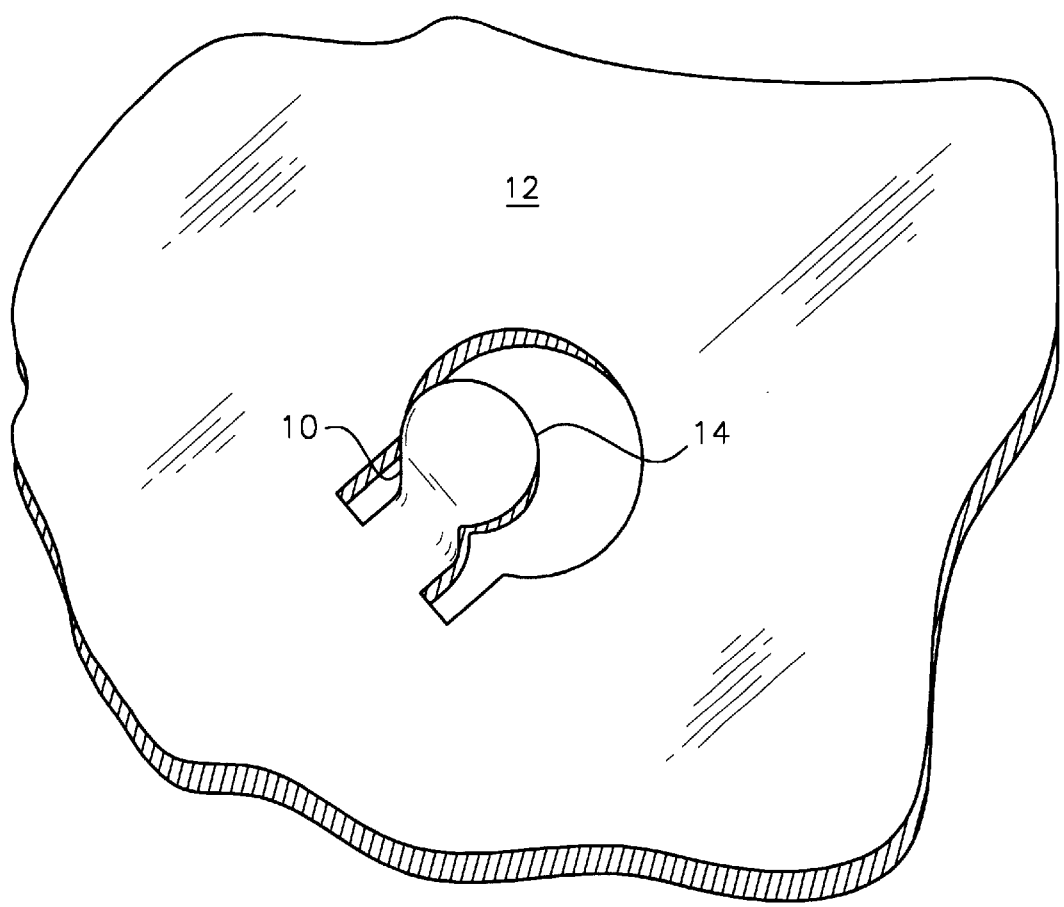
FIG. 1 is an isometric view of a T-stud embodiment of the invention.

Referring to FIG. 1, a preferred T-stud 10 is formed from workpiece 12. The manner in which T-stud 10 is formed from workpiece 12 is not particularly limited; however, as T-stud 10 is integral with workpiece 12, the T-stud must be formed from a portion of the workpiece that is never completely detached from the balance of the workpiece.

Workpiece 12, which is partially shown in FIG. 1, is a pliable sheet material, preferably sheet metal, more preferably a steel stamping.

T-stud 10 is preferably cut from workpiece 12 by stamping with a die, or slicing with a cutting device, such as a punch and die. The nascent T-stud is then elevated above the plane defined by workpiece 12 to place head 14 in a position to receive a retainer clip (not shown).

It is preferable to cut and raise T-stud in a single operation. For example, a die rotated along an arc can be used to punch out the T-stud from the workpiece and then elevate the head of the T-stud to a position further along the arc.

The shape of T-stud 10 is dictated by commercial considerations. In particular, the shape should be adapted to engage as required with the desired retaining clip(s). FIG. 1 shows a T-stud 10 having a head 14 of circular profile, but other shapes are also suitable. Of course, the invention encompasses providing studs other than T-studs, including other configurations adapted to hold clips having different holding patterns and/or adapted to fasten via different methods.

In addition to the cutting and elevating steps, it is sometimes desirable to further modify the T-stud to change its shape, position, etc. Such additional step(s) can be accomplished before, after or during the elevating step. For example, in the embodiment of FIG. 1, a 90° angle is provided in T-stud 10 after it has been cut from workpiece 12. Other additional steps include, e.g., crimping head 14 to provide a more elaborate shape, and particularly to ensure that the head fits the corresponding fastener or clip.

The invention provides studs without the problems associated with attaching non-integral studs to workpieces. Moreover, studs of the invention are at least as durable as non-integral studs. Thus, set-outs integrally formed from metal are as strong or stronger than welded studs.

While the invention has been described in detail and with reference to specific examples thereof, it will be apparent to one skilled in the art that various changes and modifications can be made therein without departing from the spirit and scope thereof.

What is claimed is:

1. A workpiece comprising sheet metal, said sheet metal including a plurality of integral T-studs formed solely from said workpiece and adapted to retain a plurality of retaining clips.

2. The workpiece of claim 1, wherein said workpiece is a portion of a vehicle body.

3. The workpiece of claim 1, wherein said workpiece is free of welded studs.

4. In a process for providing a plurality of T-studs on a metal workpiece, the improvement wherein said T-studs are formed from a plurality of integral tabs cut solely from said metal workpiece.

5. The process of claim 4, conducted without welding.

6. A studded workpiece provided by the process of claim 4.

7. The process of claim 4, wherein said metal workpiece is a portion of a vehicle body.

8. The process of claim 4, wherein said T-studs are formed by cutting or stamping.

9. A method for mounting conduits to a structure, said method comprising:

providing a sheet metal workpiece;

cutting or stamping integral T-studs in the sheet metal workpiece to provided a modified workpiece, wherein the integral T-studs are formed solely from said workpiece and are adapted to receive retaining clips;

incorporating the modified workpiece in to the structure;

attaching the retaining clips to the integral T-studs of the modified workpiece; and threading the conduits through the retaining clips to mount the conduits to the structure.

10. The method of claim 9, wherein the conduits are electrical wires.

11. The method of claim 10, wherein the structure is a motor vehicle.

12. A method for mounting conduits to a structure, said method comprising:

providing the structure containing a sheet metal workpiece;

cutting or stamping integral T-studs in the sheet metal workpiece to provide a modified workpiece, wherein the integral T-studs are formed solely from said workpiece and are adapted to receive retaining clips;

attaching the retaining clips to the integral T-studs of the modified workpiece; and threading the conduits through the retaining clips to mount the conduits to the structure.

13. The method of claim 12, wherein the conduits are electrical wires.

14. The method of claim 13, wherein the structure is a motor vehicle.

* * * * *